United States Patent [19]

Ochsner et al.

[11] Patent Number: 5,260,413
[45] Date of Patent: Nov. 9, 1993

[54] COATED, HEAT-SEALABLE AROMATIC POLYIMIDE FILM HAVING SUPERIOR COMPRESSIVE STRENGTH

[75] Inventors: James P. Ochsner, Wilmington, Del.; Darrell J. Parish, Circleville, Ohio

[73] Assignee: E. I. Du Pont de Nemours and Company, Wilmington, Del.

[21] Appl. No.: 848,189

[22] Filed: Mar. 12, 1992

Related U.S. Application Data

[62] Division of Ser. No. 475,044, Feb. 5, 1990, Pat. No. 5,106,667.

[51] Int. Cl.⁵ .................. C08G 73/10; C08G 69/26
[52] U.S. Cl. .................. 528/353; 528/125; 528/126; 528/128; 528/170; 528/172; 528/173; 528/185; 528/188; 528/220; 528/229; 528/350; 428/323; 428/328; 428/379; 428/473.5
[58] Field of Search ............ 528/353, 350, 125, 126, 528/351, 128, 170, 172, 173, 220, 229, 185, 188; 428/323, 328, 379, 473.5

[56] References Cited

U.S. PATENT DOCUMENTS

| | | | |
|---|---|---|---|
| 3,179,630 | 4/1965 | Endrey | 528/353 |
| 3,179,634 | 4/1965 | Edwards | 528/353 |
| 4,225,702 | 9/1980 | Makino | 528/353 |
| 4,497,922 | 2/1985 | Sato | 528/26 |
| 4,622,384 | 11/1986 | Manwiller | 528/353 |
| 4,666,253 | 5/1987 | Yoshida | 350/334 |
| 4,736,012 | 4/1988 | Shoji | 528/353 |
| 4,755,555 | 7/1988 | Manwiller | 528/353 |
| 4,758,476 | 7/1988 | Sekine | 528/26 |
| 4,778,872 | 10/1988 | Sasaki | 528/353 |
| 4,886,874 | 12/1989 | Nagano | 528/353 |
| 5,061,554 | 10/1991 | Hjortsberg | 428/473.5 |
| 5,070,182 | 12/1991 | Kohtoh | 528/353 |
| 5,081,229 | 1/1992 | Akahori | 528/353 |
| 5,106,667 | 4/1992 | Ochsner | 428/328 |

*Primary Examiner*—John Kight, III
*Assistant Examiner*—P. Hampton-Hightower

[57] ABSTRACT

An aromatic polyimide film coated with a thermally stable, heat-sealable thermoplastic polyimide for use as a wire insulation for superconducting magnets is disclosed. The inclusion of inorganic particles in the film improves compressive strength of the coated polyimide film.

9 Claims, No Drawings

COATED, HEAT-SEALABLE AROMATIC POLYIMIDE FILM HAVING SUPERIOR COMPRESSIVE STRENGTH

This is a division of application Ser. No. 07/475,044, filed Feb. 5, 1990 now U.S. Pat. No. 5,106,667.

BACKGROUND OF THE INVENTION

This invention relates to aromatic polyimide films coated with a thermally stable, heat-sealable thermoplastic polyimide polymer of composition defined hereinbelow. The coated film is useful as a wire insulation for superconducting magnets.

Particle accelerators are presently in use which operate at low energies and employ magnets which are relatively small and are subject to low levels of stress in operation. Such conventional magnets are insulated with a polyimide film bonded with an epoxy impregnated glass cloth.

More recently, high energy accelerators are being designed using superconducting (SSC) magnets employing superconducting wire. The magnets are larger and operate at much higher energies producing very high stresses. The magnets are prestressed when they are fabricated to a higher stress than they will see in operation to eliminate small movements which would interfere with the stable operation of an accelerator. Conventional epoxy impregnated glass cloth binder exhibits brittleness at the extreme temperatures required for SSC magnets and such binder lacks adhesion to polyimide insulation. Further, stress-cracks initiate frequently in the cured epoxy and continue to propagate completely through to the polyimide to the bare superconducting wire.

Polyimide film is a preferred insulation for high energy magnets due to its superior resistance to ionizing radiation. However, polyimide film has been found to cold-flow at the high prestresses used in new accelerator designs. Such cold-flow results in a premature loss of prestress leading to quenching of the magnets often with catastrophic results.

U.S. Pat. No. 3,505,168, issued to Dunphy et al. on Apr. 7, 1970, discloses a heat-sealable laminar structure having at least two layers of polyimide, wherein the polyimide of one layer is different from the polyimide of the other layer.

U.S. Pat. No. 3,616,177, issued to Gumerman on Oct. 26, 1971, discloses a laminar article having a layer of polyimide and a layer of a fluorinated polymer for use as a tape for electrical insulation.

U.S. Pat. No. 3,770,573, issued to Dunphy et al. on Nov. 6, 1973, discloses laminar film structures having one non-heat-sealable polyimide layer interdiffusionally bonded to a heat-sealable layer for use in the form of narrow tapes as an insulation wrap for electrical conductors.

None of these patents provides a suitable teaching without gross deficiencies for formulating a suitable insulating film for wrapping a superconducting conductor.

It has now been found that a coated aromatic polyimide film containing inorganic particles minimizes cold-flow (i.e., creep) when used as a primary insulation for SSC magnets. Moreover, the polyimide film when coated on one or both sides with a thermoplastic polyimide of the type defined hereinbelow effects sufficient adhesion between the superconducting stacks of wire needed for magnet assembly with sufficient high radiation resistance to minimize polymer degradation during the life of the magnet.

SUMMARY OF THE INVENTION

According to the present invention there is provided a coated polyimide film useful for insulating super-conducting wire comprising an aromatic polyimide film derived from reaction of an aromatic dianhydride and a diamine wherein said film contains inorganic particles with said film coated on at least one surface with a thermoplastic, heat-sealable polyimide; wherein said coated polyimide film has the following properties: (i) a radiation resistance is present of at least $10^9$ rads, (ii) a compressive strength is present of at least 10 kpsi at 25° C. and (iii) the coating is heat-sealable at a temperature less than 250° C. and (iv) adhesion of the film and coating is with a bond strength of at least 400 g/in.

The polyimide film preferably contains from 10 to 40% by weight of inorganic particles having a Moh hardness of from 4 to 15.

DETAILED DESCRIPTION OF THE INVENTION

The aromatic polyimide used as a base layer in this invention can be made by chemical or thermal conversion of a polyamide acid derived from the reaction of a dianhydride and a diamine generally as disclosed in U.S. Pat. Nos. 3,179,630 and 3,179,634, the disclosures of which are hereby incorporated by reference.

Polyamic acids are made by reacting substantially equimolar amounts of at least one aromatic dianhydride and at least one diamine in a solvent and agitating the resulting solution under controlled temperature conditions until polymerization of the dianhydride and the diamine is completed.

Suitable dianhydrides for use in the polyimides include: pyromellitic dianhydride; 2,3,6,7-naphthalene tetracarboxylic dianhydride; 3,3',4,4'-biphenyl tetracarboxylic dianhydride; 1,2,5,6-naphthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarboxyphenyl) propane dianhydride; bis(3,4-dicarboxyphenyl) sulfone dianhydride; 3,4,9,10-perylene tetracarboxylic dianhydride; bis(3,4-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; oxydiphthalic dianhydride; bis(3,4-dicarboxyphenyl) sulfone dianhydride; and the like.

Suitable diamines for use in the polyimides include: 4,4'-diaminodiphenyl propane; 4,4'-diamino diphenyl methane; benzidine; 3,3'-dichlorobenzidine; 4,4'-diamino diphenyl sulfide; 3,3'-diamino diphenyl sulfone; 4,4'-diamino diphenyl sulfone; 4,4'-diamino diphenyl ether; 1,5-diamino naphthalene; 4,4'-diamino diphenyl diethylsilane; 4,4'-diamino diphenylsilane; 4,4'-diamino diphenyl ethyl phosphine oxide; 4,4'-diamino diphenyl N-methyl amine; 4,4'-diamino diphenyl N-phenyl amine; 1,4-diaminobenzene (p-phenylene diamine); 1,3-diaminobenzene; 1,2-diaminobenzene; and the like.

The preferred polyimide used in this invention is derived from 4,4'-diaminodiphenyl ether and pyromellitic dianhydride.

Copolyimides derived from any of the above diamines and dianhydrides are also operable. Particularly preferred copolyimides are those derived from 15 to 85 mole % of biphenyltetracarboxylic dianhydride, 15 to 85 mole % pyromellitic dianhydride, 30 to 100 mole % p-phenylenediamine and 0 to 70 mole % of 4,4'-diaminodiphenyl ether. Such copolyimides are described in U.S. Pat. No. 4,778,872 which disclosure is also incorporated herein by reference.

The solvent must dissolve one or both of the polymerizing reactants and, preferably, will dissolve the polyamic acid polymerization product. The solvent must, of course, be substantially unreactive with all of the polymerizing reactants and with the polyamic acid polymerization product.

Preferred solvents include normally liquid N,N-dialkylcarboxylamides, generally. Preferred ones of those solvents include the lower molecular weight members of such carboxylamides, particularly N,N-dimethylformamide and N,N-dimethylacetamide. Other useful compounds of this class of solvents are N,N-diethylformamide and N,N-diethylacetamide. Other solvents which may be used are dimethylsulfoxide, N-methyl-2-pyrrolidone, tetramethyl urea, dimethylsulfone, hexamethylphosphoramide, tetramethylene sulfone, and the like. The solvents can be used alone, in combinations with one another or in combinations with poor solvents such as benzene, benzonitrile, dioxane, etc. The amount of solvent used preferably ranges from 75 to 90 weight % of the polyamic acid, since this concentration has been found to give optimum molecular weight.

The polyamic acid solutions are generally made by dissolving the diamine in a dry solvent and slowly adding the dianhydride under conditions of agitation and controlled temperature in an inert atmosphere. The diamine is conveniently present as a 5 to 15 weight percent solution in the solvent and the diamine and dianhydride are usually used in about equimolar amounts.

Conversion of the polyamic acid to polyimide can be accomplished by either a thermal conversion or a chemical conversion process. According to the thermal conversion process, the polyamic acid solution is cast on a heated conversion surface, such as a metal drum or belt, and heated at a temperature of above about 50° C. to increase the polymer solids to ≧60% by weight to give strippable, self-supporting film as well as partially convert the polyamic acid to polyimide. The extent of polyamic acid conversion depends on the temperature employed and the time of exposure, but, generally about 15 to 30% of amic acid groups are converted to imide groups. The partially converted polyamic acid is then heated at or above 300° C. to obtain complete conversion to the polyimide.

In the chemical conversion process, the polyamic acid solution is blended with conversion chemicals immediately prior to casting into film. The polyamic acid conversion chemicals are tertiary amine catalysts and anhydride dehydrating materials. The preferred anhydride dehydrating material is acetic anhydride and is used in slight molar excess of the amount of amic acid groups in the polyamic acid, typically about 2–2.5 moles per equivalent of polyamic acid. A comparable amount of tertiary amine catalyst is used. Besides acetic anhydride, other operable lower fatty acid anhydrides include propionic, butyric, valeric, mixed anhydrides of these with one another and with anhydrides of aromatic monocarboxylic acids, for example, benzoic acid, naphthoic acid, and the like, and with anhydrides of carbonic and formic acids, as well as aliphatic ketenes (ketene and dimethyl ketene). Ketenes may be regarded as anhydrides of carboxylic acids derived from drastic dehydration of the acids.

The preferred tertiary amine catalysts are pyridine and β-picoline and they are used in an amount of about one mole per mole of anhydride dehydrating material. Tertiary amines having approximately the same activity as the preferred pyridine and beta-picoline may also be used. These include 3,4-lutidine; 3,5-lutidine; 4-methyl pyridine; 4-isopropyl pyridine; N-dimethyl benzyl amine; isoquinoline; 4-benzyl pyridine, and N-dimethyl dodecyl amine. Trimethyl amine and triethyl amine are more active than those amines listed above and can be used in smaller amounts.

The treated polyamic acid solution is cast or extruded onto a heated conversion surface whereupon some of the solvent is evaporated from the solution, the polyamic acid is partially chemically converted to polyimide, and the solution takes the form of a polyamic acid-polyimide gel. Conversion of amic acid groups to imide groups depends on contact time and temperature but is usually about 25 to 95% complete. The gel is self-supporting in spite of its high solvent content.

The gel is subsequently dried to remove the water, residual solvent, and remaining conversion chemicals, and the polyamic acid is completely converted to polyimide. The drying can be conducted at relatively mild conditions without complete conversion of polyamic acid to polyimide at that time, or the drying and conversion can be conducted at the same time using higher temperatures. Because the gel has so much liquid which must be removed during the drying and converting steps, the gel must be restrained during drying to avoid undesired shrinkage. In continuous production, the film can be held at the edges, such as in a tenter frame using clips, for example, for restraint. A polyimide film which is permitted to shrink excessively during drying and conversion is brittle and lacks the superior performance characteristics expected of polyimide film materials.

Preferably, high temperatures are used for short times to dry the film and convert it to polyimide in the same step. It is preferred to heat the film to a temperature of 200°–450° C. for 15 to 400 seconds. Of course, less heat and time are required for thin films than for thicker films. During this drying and converting, the film is restrained from undue shrinking and, in fact, can even be stretched somewhat prior to completion of the drying and conversion. Stretching can be in any dimension. In film manufacture, stretching can be in either the longitudinal direction or the transverse direction. If desired the restraint can also be provided to permit some limited degree of shrinkage. Shrinkage of as much as 25 percent has been found to provide an adequate product.

The polyimide film base layer can vary in thickness from about 8 micrometers (0.3 mil) to about 125 micrometers (5 mils), preferably from about 17 micrometers (0.7 mil) to about 36 micrometers (1.5 mils).

The polyimide film contains preferably from 10 to 40 weight % of finely divided inorganic particles having a Moh hardness ranging from 4 to 15, more preferably from 8 (quartz) to 15 (diamond), and most preferably from 12 (alumina) to 13 (silicon carbide). The particle sizes found useful for this invention preferably range from about 0.3 micrometer to about 5 micrometers, preferably 1 to 2 micrometers. In a preferred mode substantially all particles are within the numerical ranges disclosed. However it is within the scope of this invention that in a preferred mode some particles fall outside the stated numerical values. Amounts of particulate material greater than 40 weight % may cause a loss of film properties such as tear strength and elongation. Conversely, amounts of particulate material less than 10 weight % provide little or no improvement in compressive strength. A more preferred range is from 15 to 35% by weight.

While not wishing to be bound by any specific theory, it is believed that the presence of the particulate material in the polyimide film fills enough free volume in the polyimide matrix to minimize creep while at the same time provides a hardness sufficient to absorb the bulk of the compressive energy due to stresses generated during prestressing of the magnets.

A particularly preferred polyimide film contains 20 to 35 weight % alumina and has the optimum balance of tear strength, elongation and compressive strength.

The coated polyimide film of the invention carries a continuous adherent layer of a heat-sealable thermoplastic aromatic polyimide on either one or both sides of the polyimide base layer. The coating thickness of the adherent layer depends upon the functional adhesion desired while being kept to a minimum to maximize the thickness of the polyimide base film layer. Typical thicknesses of the adherent layer are about 0.2 to 0.5 mil per side.

Heat-sealable thermoplastic polyimides which can be used as the adherent layer are selected from a much narrower group of polyimides which are structurally different from the base polyimide film layer.

Heat-sealable thermoplastic polyimides include those derived from dianhydrides such as pyromellitic dianhydride (PMDA), 4,4′-oxydiphthalic dianhydride (ODPA), 2,2-bis(3,4-dicarboxyphenyl)hexafluoropropane (6FDA) and 4,4′-bis-(3,4-dicarboxyphenoxy) diphenyl sulfide (BDSDA) and benzophenone tetracarboxylic dianhydride (BTDA) and diamines such as 1,3-bis-(4-aminophenoxy) benzene (1,3-APB), 2,4′-diaminodiphenyl ether (o,p′-ODA), 3,3′-diaminodiphenyl ether (m,m′-ODA) and 4,4′-diaminodiphenyl ether (ODA).

A particular preferred heat-sealable thermoplastic polyimide is derived from 4,4′-oxydiphthalic dianhydride and 1,3-bis(4-aminophenoxy) benzene. Additionally, copolyimides having a $T_g$ of $\leq 250°$ C. and an affinity for bonding to polyimide can be used in the invention. Preferred copolyimides include ODPA-PMDA/1,3-APB, ODPA-BTDA/1,3-APB and ODPA/1,3-APB-ODA.

The heat-sealable, coated polyimide films of the invention are obtained by applying to the polyimide base layer a coating or surface layer of a polyamide-acid precursor of a heat-sealable polyimide as described above, followed by conversion of the polyamide-acid precursor to the polyimide.

Well-known coating methods such as dip coating or kiss coating can be used in the case of two-side coated film, and kiss coating in the case of one-side coated film.

The coated film of the invention can be heat-sealed at temperatures in the range of 220° to 250° C. preferably 235° C. The pressure and dwell time during sealing can vary, but a pressure of 2-3 kpsi and dwell time of 120 seconds are typical. Temperatures of 235° C. and lower for short dwell times do not unduly damage the superconducting wire of the SSC magnets.

Heat-seal strengths of 400 to 3600 g/in, typically 800 to 1000 g/in, for coated side to coated-side seals are readily attained with the coated film of this invention.

It is desirable and preferred that heat seal strengths be at least 400 g/in and maintain at least that value after aging at a temperature of 235° C. for up to 2 hours.

The coated polyimide films of the invention exhibit outstanding resistance to irradiation from high energy electrons and from thermal neutrons. Thus, the films retain good mechanical and electrical properties after high energy electron exposure of over $4 \times 10^9$ rads.

The coated polyimide films of the invention are useful as an insulative wrapping for superconducting magnet wire. The films are preferably slit into narrow widths to provide tapes. The tape is wound around the superconducting wire or bundles thereof in preferably spiral fashion and overlapped on itself. The amount of overlap can vary depending on the angle of the wrap. The tension employed during the wrapping operation also varies widely, and can vary from just enough tension to prevent wrinkling to a tension high enough to stretch and neck down the tape. Even when the tension is low, a snug wrap results since the tape shrinks to a certain extent under the influence of heat during the ensuing heat-sealing operation. Heat-sealing of the tape is accomplished by heating the tape-wrapped wire at a temperature and for a time sufficient to fuse the heat-sealable layer of the construction. The heat-sealing temperature required can range from 220° to 250° C., to provide an adequate bond but not damage the superconductor wire.

Multiple wraps may be desirable, in particular multiple wraps provide the advantages of increasing the number of film layers between adjacent wires to minimize the impact of film weak spots or the seams between wraps. This also provides the flexibility to combine films containing and not containing inorganic particles to yield an insulation system with the ability to resist very high compressive loadings in one layer while flowing to accommodate the wire's surface in the other layer. A compressive strength is present of at least 10 kpsi at 25° C./

In the following examples all parts and percentages are by weight unless otherwise specified.

EXAMPLE 1

This example describes the preparation of a thermoplastic polyimide film derived from 4,4′-oxydiphthalic dianhydride and 1,3-bis(4-aminophenoxy)benzene having superior radiation resistance.

A polyimide film was prepared by reacting 15.5 g of 4,4′-oxydiphthalic dianhydride (ODPA) from the Occidental Chemical Corp., Niagara Falls, NY, with 14.6 g of 1,3-bis(4-aminophenoxy)benzene (1,3-APB) made by E. I. du Pont de Nemours & Company dissolved in 132 mls of dimethylacetamide. The ODPA was added in increments over a 75 to 82 minute period. The resultant polyamide acid solution had a Brookfield viscosity of 650 poises at 25° C. The solution was doctored onto a "Pyrex" glass plate using a rod gapped to give a cured film thickness of 1.25 mils and heated on a hot plate at 80° to 85° C. for 40 to 45 minutes. The resultant "green" film contained about 35% of residual dimethylacetamide and was clamped onto a frame and heated at 125° C. for 30 minutes and then at 210° to 220° C. for an additional 20 minutes. The final cured polyimide film had a thickness of 1.25 mils, contained 0.8% residual dimethylacetamide and had a melting point of 289° C. and a $T_g$, as measured with a PSC of 217° C. The resistance of the film to thermal neutron radiation was 4×10⁹ rad.

EXAMPLE 2

This example describes the preparation of a polyimide film derived from pyromellitic dianhydride (PMDA) and oxydianiline (ODA) containing from 5 to 35% of alumina particles to improve compressive strength and coated with a heat-sealable layer of an ODPA/1,3-APB polyimide.

A 25% slurry of alumina (Type A15SG from Alcoa) in dimethylacetamide was milled in a commercial Kady Mill for 25 minutes. A 100 g portion of a 20.3% solution of a polyamide acid derived from pyromellitic dianhydride and oxydianiline in dimethylacetamide was blended with 3.935 g of the alumina slurry (5% alumina content in the final film.)

The resultant dope was deaerated at room temperature for 18 to 20 hours and then a uniform layer was casted onto a glass plate using a doctor bar. The plate was heated at 98° to 102° C. for 30 minutes.

The resultant "green" film containing about 25% residual dimethylacetamide was peeled from the glass plate, clamped onto a frame and heated for 20 minutes at 150° C. and then for 10 minutes at 340° C. to thermally convert the polyamide acid to polyimide. The resultant film was 2.15 mils thick and had a residual dimethylacetamide content of 0.5%.

Similarly, six additional polyimide films were prepared by increasing the amount of alumina to 10, 15, 20, 25, 30 and 35%. All of these films were prepared by the thermal conversion process.

A portion of the 10, 20 and 25% alumina dopes prepared above were also converted to polyimide using the chemical conversion process. Films were cast from the dopes onto glass plates and immersed in a mixture of acetic anhydride and (-picoline at 25° C. until a self-supporting gel film separated from the glass plate. The resultant gel films were removed, clamped onto frames and cured as described for the thermal conversion process. The final films had thicknesses ranging from 2.05 to 2.16 mils and contained from 0.3 to 0.4% residual dimethylacetamide (See Table I).

Two control films were prepared without alumina using both the thermal and chemical conversion processes.

The aforementioned alumina containing polyimide films were all coated on both sides with a 0.1 mil layer of the ODPA/1,3-APB heat sealable polyimide described in Example 1. The coated films were clamped onto frames and thermally cured as described in Example 1.

Compressive strength was determined using a pressure-stack test wherein a four-ply stack of the coated film was contacted with a 0.5 inch diameter stainless steel ball against a hardened steel plate and the ball subjected to an initial pressure of 1500 psi. An electrical potential of 2000 volts was applied between the ball and the plate. The pressure was then reduced to 500 psi, then increased to 2000 psi and dropped to 1000 psi, increased to 2500 psi, then dropped to 1500 psi, etc. until failure occurred. Failure was indicated by an electrical short to ground that occurred when the ball ruptured the film stack and caused a charge flow to ground.

The best compressive strengths were obtained using alumina concentrations ranging from 20 to 35%. Good bonds with the heat-sealable ODPA/1,3-APB adhesive were obtained at 220° C. and 50 psi. Thermally converted films were generally found to be superior to chemically converted films both with and without alumina.

EXAMPLE 3

A polyimide casting dope of ODPA and 1,3-APB was prepared as described in Example 1. The dope was diluted with additional dimethylacetamide to a solids concentration of 13% and a viscosity of 340 poises.

Polyimide films derived from PMDA and ODA containing 22% and 35% alumina were prepared by the thermal conversion process as described in Example 2.

Film samples of the alumina containing PMDA-ODA polyimides of different thicknesses were coated on both sides or on one side with varying thicknesses of the heat-sealable polyimide dope.

The coated films were heated at 100° C. for 20 minutes and then at 270° to 280° C. for 25 minutes to completely cure the coating.

EXAMPLE 4

This example describes the effect of concentration of alumina in the PMDA/ODA base film on compressive strength.

Polyimide films derived from PMDA and ODA and containing 21.5%, 26.0%, 30.0%, 33.0% and 35% alumina were prepared by the thermal conversion process described in Example 2 and compressive strengths measured.

Higher alumina loadings generally provided better compressive strengths but accordingly lowered tear strengths of the films.

Compressive strength results for the loaded films are given in Table I.

TABLE I

| PMDA/ODA Polyimide Films Containing Alumina | | |
|---|---|---|
| Example | % Alumina | Compressive Strength (kpsi) |
| Control | 0 | 200 |
| 4a | 21.5 | 675 |
| 4b | 26.0 | 650 |
| 4c | 30.0 | 775 |
| 4d | 33.0 | 890 |
| 4e | 36.0 | 830 |

EXAMPLE 5

This example describes the effect of inorganic particulate materials having varying degrees of hardness on the compressive strength of a PMDA/ODA polyimide base film.

Polyimide films derived from PMDA and ODA and containing 22% of the particulate materials listed in Table II were prepared by the thermal conversion process described in Example 2. Typical particle sizes ranged from 1 to 2 microns except for diamond which ranged from 2 to 40 microns. The films were all 1.05 mils thick.

TABLE II

| EFFECT OF PARTICULATE HARDNESS ON COMPRESSIVE STRENGTH OF PMDA/ODA POLYIMIDE FILM | | |
|---|---|---|
| Example | Particulate Material | Moh Hardness | Compressive Strength (kpsi) |
| 5a | Talc | 1 | 160 |
| 5b | Calcium Carbonate | 3 | 150 |
| 5c | Calcium fluoride | 4 | 250 |

TABLE II-continued

EFFECT OF PARTICULATE HARDNESS ON COMPRESSIVE STRENGTH OF PMDA/ODA POLYIMIDE FILM

| Example | Particulate Material | Moh Hardness | Compressive Strength (kpsi) |
|---------|---------------------|--------------|----------------------------|
| 5d | Quartz | 8 | 320 |
| 5e | Alumina | 12 | 800 |
| 5f | Silicon carbide | 13 | 700 |
| 5g | Diamond dust | 15 | 70 |
| Control | None | — | 160 |

Satisfactory compressive strengths were obtained for quartz, alumina and silicon carbide with alumina providing particularly good results. The apparent anomaly with the diamond duct may be attributable to a decidedly low level of adhesion between the polyimide and the diamond.

EXAMPLE 6

A roll of 1 mil polyimide film derived from PMDA and ODA and containing 21.5% of alumina was prepared by the thermal conversion process described in Example 2. The film was coated using a commercial Gravure roll coater to a thickness of 0.1 mil on one side with the ODPA/I,3-AMP heat-sealable polyimide described in Example 1.

A 1.5×5 inch strip of one-side coated film was bonded coated-side to coated-side in a platen press at selected temperatures and at a pressure of 40 kpsi. Peel strengths were measured using a Suter peel tester and the results are given in Table III.

TABLE III

EFFECT OF HEAT-SEAL TEMPERATURE ON BOND STRENGTH OF ODPA/1,3-APB COATED PMDA/ODA POLYIMIDE FILM

| Heat-Seal Temperature (°C.) | Peel strength (g/in) |
|---|---|
| 260 | 1025 |
| 250 | 1300 |
| 220 | 480 |
| 210 | 265 |
| 205 | 260 |
| 195 | 125 |
| 190 | 125 |
| 180 | 30 |

An optimum heat-seal temperature range of 205° to 220° C. was fond to maximize bond strength while minimizing damage to the superconducting wire.

EXAMPLE 7

A 12% solids polyamide acid solution was prepared by heating equimolar amounts of 4,4'-oxydiphthalic dianhydride (ODPA) and 1,3-bis(4-aminophenoxy) benzene (1,3-APB) in dimethylacetamide. The resultant solution had a viscosity of 15 poises at 24° C.

The solution was continuously extruded through a slit die onto a 1.0 mil thick polyimide film derived from equimolar amounts of pyromellitic dianhydride (PMDA) and oxydianiline (ODA) and partially cured at 170° C. to a residual dimethylacetamide content of 24% to 34%. The partially cured coating had a thickness of 0.28 mil.

To prevent blocking of the partially cured coating, the film was interleaved with polyethylene film as it was wound up. The coated film roll was subsequently unwound, de-interleaved and coated on the reverse side using the same procedure to obtain a 0.28 mil coating on the reverse side. The roll of two-side coated film was de-interleaved and threaded into a radiantly heated tenter oven and cured at 250° to 260° C. The resultant two-side coated polyimide film was 1.4 mils thick and had a residual dimethylacetamide content of 0.5%.

EXAMPLE 8

A one-side coated PMDA/ODA polyimide film was prepared as described in Example 7. The cured coating thickness was 0.2 mil.

Coated-side to coated-side film surfaces were bonded in a platen press at 250° C. using a pressure of 40 kpsi and a dwell time of 2.5 minutes. The peel strength as measured with a Suter peel tester was 925 g/inch.

What is claimed is:

1. A coated polyimide film useful for insulating superconducting wire, comprising an aromatic polyimide base film derived from an aromatic dianhydride and a diamine wherein said base film contains from 10 to 40 weight % of inorganic particles having a MOH hardness in a range from 4 to 15 with said base film being coated on at least one surface with an adherent layer of a structurally different thermoplastic heat-sealable polyimide; wherein said coated polyimide film has the following properties: (i) a radiation resistance (is present) of at least $10^9$ rads, (ii) a compressive strength (is present) of at least 10 Kpsi at 25° C., (iii) the coating heat-sealable at a temperature less than 250° C.; and (iv) adhesion of the base film and coating layer with a bond strength of at least 400 g/in.

2. The coated film of claim 1 wherein all particles are in a range from 0.3 to 5 micrometers having a hardness in a range from 8 to 15.

3. The coated film of claim 2 wherein said particle range is from 1 to 2 micrometers and said hardness range is from 12 to 13.

4. The coated polyimide film of claim 1 wherein said inorganic particles are alumina particles.

5. The coated polyimide film of claim 4 wherein the alumina particles are present in an amount of from 20 to 35 weight %.

6. The coated polyimide film of claim 1 wherein said heat-sealable polyimide comprises a product of 4,4'-oxydiphthalic dianhydride and 1,3-(4-aminophenoxy)-benzene.

7. The coated polyimide film of claim 1 wherein said heat-sealable polyimide comprises a product of 1 to 10 mole % pyromellitic dianhydride and 99 to 90 mole % 4,4'-oxydiphthalic dianhydride with 1,3-(4-aminophenoxy)benzene.

8. The coated polyimide film of claim 1 wherein said heat-sealable polyimide comprises a product of 1 to 10 mole % 3,3',4,4'benzophenone tetracarboxylic dianhydride and 99–90 mole % 4,4'-oxydiphthalic dianhydride with 1,3-(4-aminophenoxy)benzene.

9. The coated polyimide film of claim 1 wherein said heat-sealable polyimide comprises a product of 4,4'-oxydiphthalic dianhydride with 1 to 10 mole % 4,4'-diaminodiphenyl ether and 99 to 90 mole % 1,3-(4-aminophenoxy) benzene.

* * * * *